United States Patent
Moore et al.

(10) Patent No.: US 12,304,389 B2
(45) Date of Patent: May 20, 2025

(54) VEHICLE CUT-IN THREAT DETECTION AND MITIGATION BETWEEN A LEADER AND FOLLOWER PLATOON

(71) Applicant: GM GLOBAL TECHNOLOGY OPERATIONS LLC, Detroit, MI (US)

(72) Inventors: Joseph K Moore, Whitby (CA); Balbir Singh Sangha, Ajax (CA); Mansoor Alghooneh, Richmond Hill (CA); Terry W Ostan, Whitby (CA); Anthony J Corsetti, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 217 days.

(21) Appl. No.: 18/304,903

(22) Filed: Apr. 21, 2023

(65) Prior Publication Data

US 2024/0351519 A1    Oct. 24, 2024

(51) Int. Cl.
*B60Q 9/00*    (2006.01)
*G08G 1/00*    (2006.01)

(52) U.S. Cl.
CPC ..... *B60Q 9/00* (2013.01); *G08G 1/22* (2013.01)

(58) Field of Classification Search
CPC .................................... B60Q 9/00; G08G 1/22
USPC ........................................................ 340/425.5
See application file for complete search history.

(56) References Cited

U.S. PATENT DOCUMENTS

| | | | | |
|---|---|---|---|---|
| 11,667,216 | B2* | 6/2023 | Ribero | B60R 21/01512 180/282 |
| 11,922,787 | B1* | 3/2024 | Barcia | G06V 10/70 |
| 2004/0130902 | A1* | 7/2004 | Snyder | B60Q 3/30 362/540 |
| 2010/0328644 | A1* | 12/2010 | Lu | H04N 23/57 356/5.01 |
| 2011/0190972 | A1* | 8/2011 | Timmons | G08G 1/167 701/31.4 |
| 2016/0330819 | A1* | 11/2016 | Leadford | H05B 47/19 |
| 2017/0344023 | A1* | 11/2017 | Laubinger | B60W 30/165 |
| 2018/0201227 | A1* | 7/2018 | Gao | B60R 25/305 |
| 2018/0210464 | A1* | 7/2018 | Switkes | B60W 10/18 |
| 2019/0184987 | A1* | 6/2019 | Lee | G01S 13/726 |
| 2019/0329778 | A1* | 10/2019 | D'sa | G06V 20/56 |
| 2019/0351899 | A1* | 11/2019 | Adam | B60W 30/09 |
| 2019/0373419 | A1* | 12/2019 | Bayley | G08G 1/22 |
| 2020/0057453 | A1* | 2/2020 | Laws | G05D 1/0088 |
| 2020/0125086 | A1* | 4/2020 | Switkes | G05D 1/0061 |
| 2020/0125117 | A1* | 4/2020 | Switkes | H04W 4/029 |
| 2020/0135033 | A1* | 4/2020 | Switkes | G08G 1/22 |
| 2020/0160537 | A1* | 5/2020 | Urtasun | G06T 7/593 |

(Continued)

*Primary Examiner* — Brian A Zimmerman
*Assistant Examiner* — Thang D Tran
(74) *Attorney, Agent, or Firm* — Lorenz & Kopf LLP

(57) ABSTRACT

Methods and systems for a vehicle of a remote transportation system. A vehicle includes a non-transitory computer readable media and one or more processors configured by programming instructions on the non-transitory computer readable media to: coordinate a platooning operation between the first vehicle and a second vehicle; monitor an environment of the first vehicle and the second vehicle while platooning; in response to the monitoring, determine a threat level vassociated with a cut-in operation of at least one object within the environment; and selectively activate at least one visual or audio cue based on the threat level to avoid the cut-in operation.

18 Claims, 4 Drawing Sheets

(56) References Cited

U.S. PATENT DOCUMENTS

| | | | |
|---|---|---|---|
| 2020/0201356 A1* | 6/2020 | Schuh | B60W 30/165 |
| 2021/0031767 A1* | 2/2021 | Kim | B60Q 1/507 |
| 2021/0099834 A1* | 4/2021 | Mountford | H04W 4/023 |
| 2021/0237779 A1* | 8/2021 | Das | G08G 1/0129 |
| 2021/0295728 A1* | 9/2021 | Sarrafzadeh | G06V 40/172 |
| 2022/0379924 A1* | 12/2022 | Foster | B60W 30/18154 |
| 2023/0054037 A1* | 2/2023 | Switkes | B60W 10/20 |
| 2023/0103248 A1* | 3/2023 | Abrash | B60W 10/18 |
| | | | 701/26 |
| 2023/0169870 A1* | 6/2023 | Hsu | B60W 50/14 |
| | | | 701/25 |
| 2023/0316914 A1* | 10/2023 | McLaine | B60K 35/235 |
| | | | 701/117 |
| 2023/0331161 A1* | 10/2023 | Varekar | B60K 35/22 |

* cited by examiner

VEHICLE CUT-IN THREAT DETECTION AND MITIGATION BETWEEN A LEADER AND FOLLOWER PLATOON

TECHNICAL FIELD

The technology described in this patent document relates generally to leader and follower platooning between two or more vehicles, and more particularly to systems and methods for detecting and mitigating vehicle cut-in threats between leader and follower platoons.

An autonomous vehicle is a vehicle that can sense its environment and navigating with little or no user input. An autonomous vehicle senses its environment using sensing devices such as radar, lidar, image sensors, and the like. The autonomous vehicle system further uses information from a positioning system including global positioning systems (GPS) technology, navigation systems, vehicle-to-vehicle communication, vehicle-to-infrastructure technology, and/or drive-by-wire systems to navigate the vehicle.

Some autonomous vehicles include leader and/or follower platooning capabilities where one unmanned vehicle closely follows another leader vehicle. In one configuration, the leader vehicle is responsible for navigation and path planning while the follower vehicle replicates the leader motion safely. In this leader/follower platoon, the follower behaves like a trailer with a communication link to the leader. Vehicle "cuts-in" between the leader and follower need to be mitigated to ensure that the follower is following the leader. Mitigation of "cut-in" is partially achieved by close coupled following (for example target distance of approximately three meters), however additional mitigation is needed to reduce the potential for cut-ins by other vehicles.

Accordingly, it is desirable to provide systems and methods for detecting and mitigating vehicle cut-in threats between leader and follower platoons. Furthermore, other desirable features and characteristics will become apparent from the subsequent detailed description and the appended claims, taken in conjunction with the accompanying drawings.

SUMMARY

Methods and systems are provided for a vehicle of a remote transportation system. A vehicle includes a non-transitory computer readable media and one or more processors configured by programming instructions on the non-transitory computer readable media to: coordinate a platooning operation between the first vehicle and a second vehicle; monitor an environment of the first vehicle and the second vehicle while platooning; in response to the monitoring, determine a threat level value associated with a cut-in operation of at least one object within the environment; and selectively activate at least one visual or audio cue based on the threat level to avoid the cut-in operation.

In various embodiments, the non-transitory computer readable media and one or more processors are further configured to determine the threat level based on an adjacency of the at least one object and a context associated with the at least one object. The adjacency includes a path trajectory of the first vehicle, velocity of the at least one object, acceleration of the at least one object, and a relative distance or zone location of the at least one object. And the context includes turn signal activation, lateral path distance to the first vehicle or the second vehicle, lateral path velocity in the direction of the first vehicle or the second vehicle, traffic congestion associated with the at least one object, and lane closure data.

In various embodiments, the non-transitory computer readable media and one or more processors are further configured to determine the threat level based on a heuristic method that evaluates the adjacency and the context.

In various embodiments, the non-transitory computer readable media and one or more processors are further configured to determine the threat level based on a trained data driven model that evaluates the adjacency and the context.

In various embodiments, the at least one visual cue includes a gap regulation cue.

In various embodiments, the at least one visual cue includes a motion coordination cue.

In various embodiments, the at least one visual cue includes a physical tether cue.

In various embodiments, the at least one visual cue includes a projection lighting cue.

In various embodiments, the at least one visual cue includes a vehicle lighting cue.

In various embodiments, the at least one visual cue includes a soft deployable object cue.

In various embodiments, the at least one visual cue includes a signage cue.

In various embodiments, the at least one visual cue includes a leader vehicle operation cue.

In various embodiments, the at least one audio cue includes an active horn cue, and an audible chime cue.

In various embodiments, the at least one audio cue includes an audible chime cue.

In another embodiment, a method includes: coordinating, by a processor, a platooning operation between the first vehicle and a second vehicle; monitoring, by the processor, an environment of the first vehicle and the second vehicle while platooning; in response to the monitoring, determining, by the processor, a threat level associated with a cut-in operation of at least one object within the environment; and selectively activating, by the processor, at least one visual or audio cue based on the threat level to avoid the cut-in operation.

In various embodiments, the determining the threat level is based on an adjacency of the at least one object and a context associated with the at least one object. The adjacency includes a path trajectory of the first vehicle, velocity of the at least one object, acceleration of the at least one object, and a relative distance or zone location of the at least one object. And the context includes turn signal activation, lateral path distance to the first vehicle or the second vehicle, lateral path velocity in the direction of the first vehicle or the second vehicle, traffic congestion associated with the at least one object, and lane closure data.

In various embodiments, the determining the threat level is based on a heuristic method that evaluates the adjacency and the context.

In various embodiments, the determining the threat level is based on a trained data driven model that evaluates the adjacency and the context.

In various embodiments, the at least one visual cue includes at least one of a gap regulation cue, a motion coordination cue, a physical tether cue, a projection lighting cue, a vehicle lighting cue, a deployable object cue, a signage cue, and a leader vehicle operation cue.

In various embodiments, the at least one audio cue includes at least one of an active horn cue and an audible chime cue.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
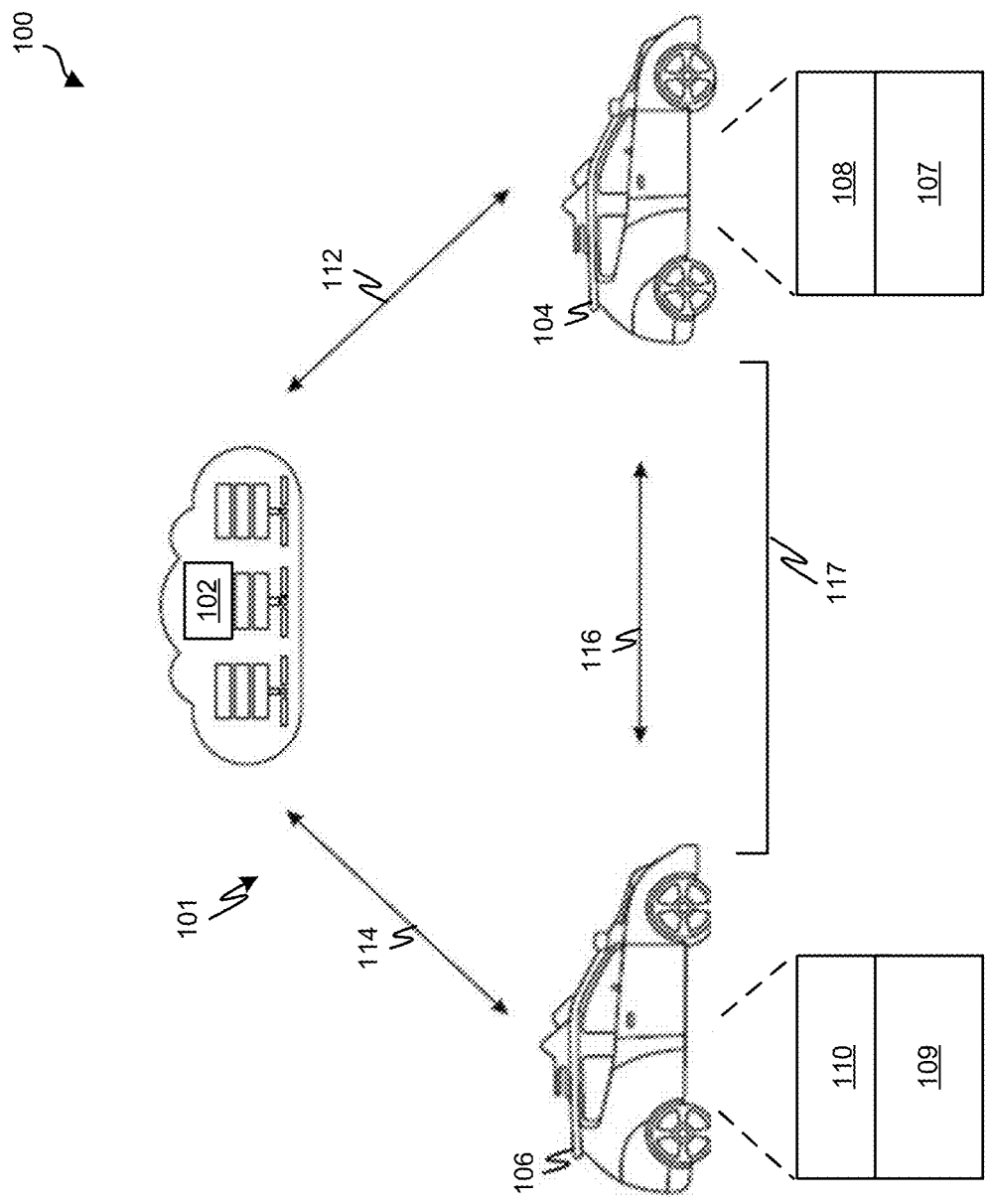
FIG. 1 is a block diagram illustrating an example transportation system for providing platooning services, in accordance with various embodiments.

With reference now to FIG. 1, a functional block diagram illustrates an example transportation system 100 that includes a cut-in threat system 101 in accordance with various embodiments. In various embodiments, the transportation system 100 includes a platoon service module 102, a non-autonomous or autonomous or semi-autonomous vehicle 104 referred to as a leader vehicle 104, and one or more autonomous or semi-autonomous vehicles 106 referred to as a follower vehicle 106. In general, the transportation system 100 enables a platooning service with programmed modules, sensors, and communication systems that enable one of the leader vehicles 104 to be followed by or to "tow" one or more of the follower vehicles 106. In general, the cut-in threat system 101 detects threats from other vehicles on the roadway to "cut-in" to a space 117 between the leader vehicle 104 and the follower vehicle 106 and selectively activates visual and/or audio cues in an effort to prevent the "cut-in" operation.

In various embodiments, the platooning service allows for autonomous equipped vehicles or sensor sets that enable autonomous operation to extend their autonomous driving capabilities to other autonomous vehicles that may be unable to navigate on their own. In various embodiments, the leader vehicle 104 (whether it be a full vehicle or a sensor kit) is configured with at least one controller 107 that includes a leader module 108 that communicates control instructions to the follower vehicle 106 to follow the leader vehicle 104 to a determined location. The leading can be by way of providing control commands for the follower vehicle 106 to follow or by way of providing sensed data or perception data for the follower vehicle 106 to evaluate when determining commands, and/or by providing a combination of control commands and sensed/perception data.

The follower vehicle 106 is configured with at least one controller 109 that includes a follower module 110 that controls the follower vehicle 106 to relinquish all or parts of driving control to the leader vehicle 104 for the trip to the location by following the leader vehicle 104 and/or following the commands or sensor data of the sensor set.

In various embodiments, the follower vehicle 106 is communicatively coupled to the platoon service module 102 via a communication link 114, and the leader vehicle 104 is communicatively coupled to the platoon service module 102 via a communication link 112. Through the communication links 112, 114, the platoon service module 102 can facilitate setup of a platoon between the follower vehicle 106 and the leader vehicle 104, monitor the platoon procedure, communicate status information regarding the platoon procedure to each other, communicate platoon termination requests between the vehicles 104, 106, communicate safety information between the vehicles 104, 106, as well as other tasks to enable an effective platooning service.

In various embodiments, the follower vehicle 106 is dynamically coupled to the leader vehicle 104 via a virtual link 116. The virtual link 116 is established when a need for platooning has been identified and the leader vehicle 104 is in proximity to the follower vehicle 106. In various embodiments, the virtual link 116 and the communication links 112, 114, may be implemented using a wireless carrier system such as a cellular telephone system and/or a satellite communication system. The wireless carrier system can implement any suitable communications technology, including, for example, digital technologies such as CDMA (e.g., CDMA2000), LTE (e.g., 4G LTE or 5G LTE), GSM/GPRS, or other current or emerging wireless technologies.

The communication links 112, 114, may also be implemented using a conventional land-based telecommunications network coupled to the wireless carrier system. For example, the land communication system may include a public switched telephone network (PSTN) such as that used to provide hardwired telephony, packet-switched data communications, and the Internet infrastructure. One or more segments of the land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
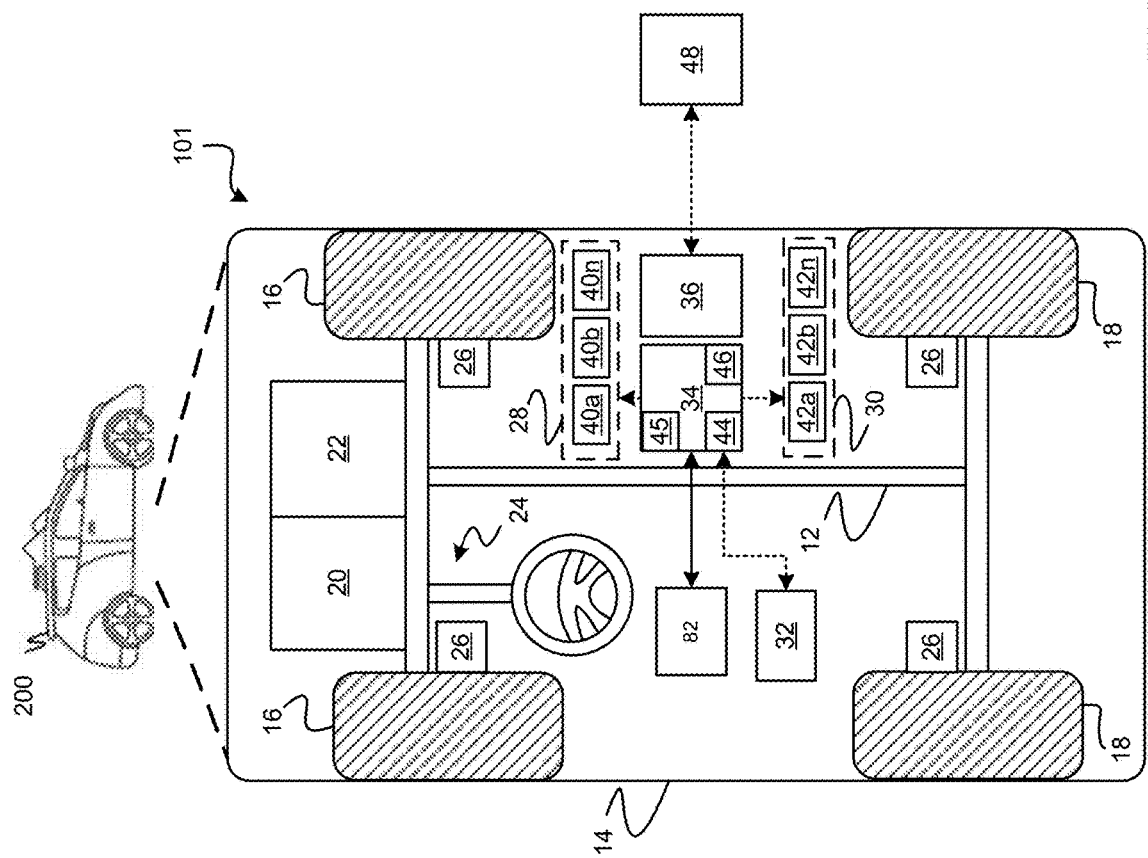
FIG. 2 is a block diagram illustrating an example vehicle that may be used in the example transportation system as a leader vehicle and/or a follower vehicle, in accordance with various embodiments.

Referring now to FIG. 2 and with continued reference to FIG. 1, a block diagram illustrates an example vehicle 200 that may be used in the example transportation system 100 as the follower vehicle 106 and/or the leader vehicle 104. The example vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 200 is depicted in the illustrated embodiment as a passenger car, but other vehicle types, including trucks, sport utility vehicles (SUVs), recreational vehicles (RVs), etc., may also be used. The vehicle 200 may be capable of non-autonomous, semi-autonomous, or autonomous operation.

In various embodiments, the vehicle 200 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, a communication system 36 that is configured to wirelessly communicate information to and from other entities 48, such as the other vehicle 104, 106 and the platoon service module 102, and a notification device 82 that generates visual, audio, and/or haptic notifications or cues to users in proximity to the vehicle 200 as will be discussed in more detail below.

The sensor system 28 includes one or more sensing devices 40a-40n that sense observable conditions of the exterior environment and/or the interior environment of the vehicle 200. The sensing devices 40a-40n can include, depending on the level of autonomy of the vehicle 200, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26.

The communication system 36 is configured to wirelessly communicate information to and from the other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 200. The data storage device 32 may be part of the controller 34, separate from the controller 34, or part of the controller 34 and part of a separate system. The controller 34 may include the controller 107 or 109 or may be separate from the controller 107 or 109 and includes at least one processor 44 and a computer-readable storage device or media 46. Although only one controller 34 is shown in FIG. 2, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. In various embodiments, the instructions may be implemented as a cut-in threat detection and mitigation module 45 of the controller 34. The instructions, when executed by the processor, perform cut-in threat detection and mitigation as will be discussed in more detail with regard to FIGS. 3 and 4.

Figure 3:
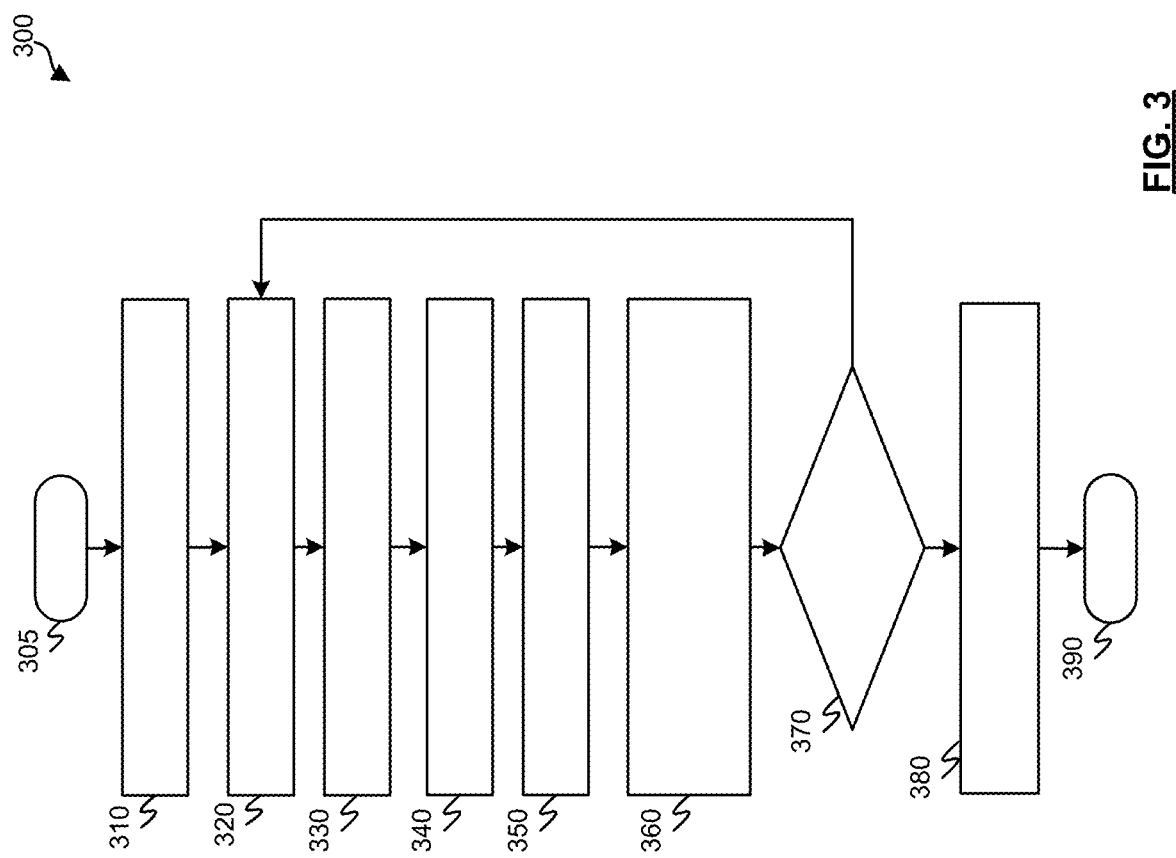
FIG. 3 is a flowchart illustrating a method performed by one or more elements of the transportation system to perform the platooning services, in accordance with various embodiments.

Referring now to FIG. 3 and with continued reference to FIGS. 1-2, a flowchart illustrates a control method 300 that can be performed by system 100 of FIG. 1, and more particularly by the cut-in threat detection and mitigation module 45 of FIG. 2 in accordance with the present disclosure. As can be appreciated in light of the disclosure, the order of operation within the control method 300 is not limited to the sequential execution as illustrated in FIG. 3 but may be performed in one or more varying orders as applicable and in accordance with the present disclosure. In various embodiments, the method 300 can be scheduled to run based on one or more predetermined events, and/or can run continuously during operation of the system 100.

In one example, the method 300 may begin at 305. The leader/follower platooning mode and vehicle pairing is enabled at 310. Thereafter, sensor data from the sensor systems 28 of the vehicles 104, 106 is collected such that the environment surrounding the leader vehicle 104 and the follower vehicle 106 is monitored at 320. The sensor data is combined or evaluated separately, and objects are detected using one or more object recognition methods at 330.

At 340, the identified objects are further evaluated and assigned a threat level value based on the possibility of the vehicle to "cut-in" between the leader vehicle 104 and the follower vehicle 106. In various embodiments, a heuristic-based method is used to determine the threat level value. The heuristic-based method considers path trajectory of the "other road user" relative to the leader/follower including relative speed, longitudinal distance, and acceleration to establish the presence of a threat. Compounding factors that increase the threat potential may include lateral trajectory (distance and change), turn signals, traffic congestion and vehicle speed and they may amplify the probability of the threat outcome.

In various embodiments, the threat may be represented by:

$$P_{Threat} = \sum_i \left[ T_i \text{ (path, } vel, accel, dist) * \left\{ 1 + \sum_j K_{ij} \text{ (turn signal, lat path, traffic, } v2x \text{ } info) \right\} \right]. \quad (1)$$

Where: $T_i$ represents the threat for "other road user" i based on adjacency, and $K_{ij}$ represents the compounding threat factors j for "other road user" i based on context. In various embodiments $T_i$ and $K_{ij}$ maybe defined by Tables 1 and 2 below.

Figure 4:
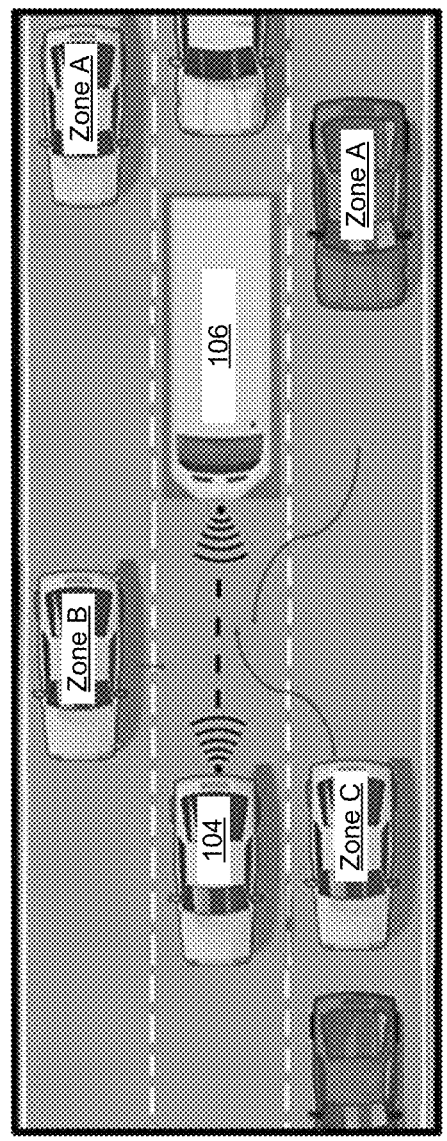
FIG. 4 is an illustration of a platooning service between the leader vehicle and the follower vehicle on a roadway, in accordance with various embodiments.

For example, $T_i$ the threat for "other road user" i based on adjacency to the leader follower platoon can be further determined based on path trajectory, velocity, acceleration, and relative distance or zone location of other road users as shown in Table 1 and FIG. 4.

TABLE 1

| Path Trajectory of "Other Road User" i | Velocity of "Other Road User" i | Acceleration of "Other Road User" i | Relative Distance for "Other Road User" i | Threat $T_i$ |
|---|---|---|---|---|
| From Behind | Greater than the follower | +/− to follower | In zone A | Distribution with max value of 1 and variance with respect to velocity/distance/acceleration |
| | Less than or equal to the follower | Greater than the follower | In Zone A | Distribution with max value of 0.5 and variance with respect to velocity/distance/acceleration |
| From the Side | +/− to follower | +/− to follower | In zone B | Distribution with max value of 2 and variance with respect to velocity/distance/acceleration |
| From the Front | Greater than or equal to leader | Less than leader | In zone C | Distribution with max value of .25 and variance with respect to velocity/distance/acceleration |
| | Less than leader | +/− to leader | In zone C | Distribution with max value of 1.25 and variance with respect to velocity/distance/acceleration |

In another example, the compounding threat factors j for "other road user" i based on context can be further based on a lookup table of the compounding factors and the resulting K value as shown in Table 2.

TABLE 2

| Compounding Factors j | $K_{ij}$ |
|---|---|
| "Other Road User" turn signal activated in direction of leader/follower | 1.25 |
| Lateral path (distance) to leader/follower less than a threshold | 0.5 |
| Lateral path (velocity) in direction of leader/follower | 1.0 |
| Traffic congestion in front of other road user detected (either perception or V2X) | 0.75 |
| V2X or mapping data indicates lane closure ahead indicating merging traffic | 0.75 |

In various embodiments, a data driven model (e.g., machine learning model or deep learning model) can be used to classify the threat of cut-ins at 340, based on defined feature descriptions as shown in Table 3.

TABLE 3

| ML/DL Feature Description |
|---|
| Range, and azimuth of a vehicle/moving object i adjacent to the lead vehicle (sent over to the follower through V2V) |
| Range, and azimuth of a vehicle/moving object i adjacent to the follower vehicle |
| Yaw of a vehicle/moving objects i adjacent to the lead vehicle (Sent over to the follower through V2V) |
| Yaw of a vehicle/moving objects i adjacent to the follower vehicle |
| Longitudinal and lateral velocity of a vehicle/moving object i adjacent to the lead vehicle (Sent over to the follower through V2V) |
| Longitudinal and lateral acceleration of a vehicle/moving object i adjacent to the lead vehicle (Sent over to the follower through V2V) |
| Longitudinal and lateral velocity of a vehicle/moving objects i adjacent to the follower vehicle |
| Longitudinal and lateral acceleration of a vehicle/moving objects i adjacent to the follower vehicle |
| Dynamics information of the lead vehicle such as steering angle, braking, throttle, (sent over to the follower through V2V) |
| Relative range, azimuth, yaw of the lead vehicle to the follower |
| Turning indicator detection of vehicles adjacent to the lead or follower vehicles |
| Free space envelope of the lead vehicle |
| Free space envelope of the follower vehicle |
| Road marking information about the locations of the curbs |
| Traffic sign information about the type of traffic signs and their locations |
| Lane marking information about the location of the lanes and where they are located |
| HD map information on lane marking, traffic sign information, road marking information of an object i |
| V2X information including lane closure and traffic congestion |

The data driven model learns and extracts the relevant features or establishes a new set of features that include a combination of the features listed above. The new extracted features along with labels are used to train the model (e.g., ensemble bagged trees, support vector machine (SVM), or other model). In various embodiments, the training data may be crowd sourced from vehicles on the road. The trained model is then evaluated to ensure that the model is not overfitted or underfitted including but not limited to cross-correlation evolution.

The above embodiment can be implemented in an end-to-end architecture using machine learning, deep learning, or recurrent deep learning models such as, but not limited to, a neural network (NN), a convolutional neural network (CNN), or a recurrent neural network (RNN) where the model extracts the patterns and relevancies of the original raw features and identifies the threat detection probability of object I adjacent to the follower vehicle 104. The model can continue to learn based on real world threat experience through retraining and retuning.

Once the threat level has been determined by the heuristic rules or the trained data driven model at 340, sensory cues including visual and/or audible cues are selectively activated at 350 and 360. For example, cue types are selected from any number of visual and/or audible cue types that are available on the leader vehicle 104 and/or the follower vehicle 106 at 350. The cue types can be selected based on, for example, the threat level value falling within a range associated with the cue type or other conditions associated with the vehicles 104, 106, conditions associated with traffic in the environment of the vehicles 104, 106, and/or ambient conditions associated with the environment of the vehicles 104, 106. In various embodiments, the threat level ranges can pre-defined to include a low threat, a medium threat, and a high threat. As can be appreciated, any number of ranges can be defined as the disclosure is not limited to the examples provided.

Once the cue types have been selected, control signals are generated to control the notification device 82 and/or other components of the vehicle 200 to initiate the cue of the selected cue type. In various embodiments, the visual cue types can include, but are not limited to, a gap regulation cue, a motion coordination cue, a physical tether cue, a projection lighting cue, a vehicle lighting cue, a deployable object cue, a signage cue, and a leader vehicle operation cue.

For example, the gap regulation cue controls the speed of the follower vehicle 106 by adjusting the distance or gap between the leader vehicle 104 and the follower vehicle 106 to, for example, three meters or fewer at lower speeds to mitigate cut-in operations.

In another example, the motion coordination cue coordinates motion of the leader vehicle 104 and the follower vehicle 106 to be the same or similar to demonstrate the connection through a virtual "invisible" link. For example, the coordinated motion can be used to identify the link at traffic lights or during other stop and go traffic.

In another example, the physical tether cue includes a physical tether that couples to the leader vehicle 104 and the follower vehicle 106 that creates a barrier of the space between the leader vehicle 104 and the follower vehicle 106. The physical tether may be of a material that is adjustable, collapsible, and retractable and of a color that that is bright and distinguishable during the day and reflective at night.

In another example, the projection lighting cue includes projecting lighting on the ground between the leader vehicle 104 and the follower vehicle 106. The color, text, and/or graphics can be defined to indicate that the space is virtually occupied and to exercise caution.

In another example, the vehicle lighting cue includes activating exterior lights of the leader vehicle 104 and the follower vehicle 106 in a coordinated fashion to illustrate the relationship.

In another example, the deployable object cue includes an object that is coupled to and deployed from, for example, a bumper or hitch area of the leader vehicle 104. When deployed, the object occupies the space between the leader vehicle 104 and the follower vehicle 106. In various embodiments, the deployable object may include an object made of a soft foam or other material that keeps a defined form while deployed.

In another example, the signage cue includes presenting or illuminating on the front, rear, and/or side of the leader vehicle 104 and the follower vehicle 106 (e.g., as an additional element or integrated into an existing element such as the vehicle glass). The color, text, and/or graphics can be defined to indicate caution of the link and that the space is virtually occupied.

In another example, the leader operation cue includes a modified operation of the leader vehicle 104, for example, a slowing down request to the leader vehicle 104 to allow for the other road user to merge in front of the leader vehicle 104. A message is displayed to occupants of the leader vehicle 104 and/or the follower vehicle 106 to indicate that the leader vehicle 104 is slowing down.

In various embodiments, the audio cue types can include, but are not limited to, an active horn cue, and an audible chime cue. For example, the active horn cue includes activating a horn of the leader vehicle 104 and/or the follower vehicle 106. In another example, the audible chime cue includes activating a chime or other digital sound from an exterior audio device of the leader vehicle 104 and/or the follower vehicle 106. In various embodiments, the sound can include exemplary intermittent beeps that can have increasing volume and frequency as the threat level increases.

At 370, if the detected object falls within a distance range of the allocated space between the leader vehicle 104 and the follower vehicle 106, the leader vehicle 104 and the follower vehicle 106 fall into a degraded follow state at 380 and the method 300 may end at 390.

If, however, the detected object identifies the cues and remains outside of the range of the allocated space between the leader vehicle 104 and the follower vehicle 106 at 370, the method 300 continues with monitoring the surrounding environment of the leader vehicle 104 and the follower vehicle 106 at 320. As can be appreciated, the method 300 continues so long as the follow mode is enabled to ensure that cut-ins within the space 117 between the vehicles 104, 106 are mitigated and thus, allowing for improved platooning services.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for a first vehicle, comprising:
   a non-transitory computer readable media and one or more processors configured by programming instructions on the non-transitory computer readable media to:
   obtain, via a plurality of perception sensors including radar sensors, Lidar sensors, and ultrasonic sensors, sensor data as to objects and other road users in proximity to the first vehicle and the second vehicle;
   coordinate a platooning operation between the first vehicle and a second vehicle;
   monitor an environment of the first vehicle and the second vehicle while platooning, based on the sensor data;
   in response to the monitoring, determine a threat level associated with a cut-in operation of at least one object within the environment, based on a product of an initial threat value of the at least one object multiplied by a sum of multiple compounding threat factors for the at least one object added together, wherein:
   the initial threat value of the at least one object is based on an adjacency of the at least one object and a context associated with the at least one object, wherein the adjacency corresponds to the initial threat value, and includes a path trajectory of the first vehicle, velocity of the at least one object, acceleration of the at least one object, and a relative distance or zone location of the at least one object;
   the multiple compounding factors are determined based on a context associated with the at last one object, wherein the context corresponds to the corresponding threat factors, and includes each of the following: signal activation, lateral path distance to the first vehicle or the second vehicle, lateral path velocity in the direction of the first vehicle or the second vehicle, traffic congestion associated with the at least one object, and lane closure data; and
   the threat level associated with the cut-in operation of at least one object is further determined based on a heuristic method that evaluates the adjacency and the context in addition to a trained data driven convolutional neural network model that evaluates the adjacency and the context; and automatically provide one or more vehicle control actions of the first vehicle and the second vehicle, including coordinating movement of the first vehicle with the second vehicle, via the one or more processors, based on the threat level associated with the cut-in operation of at least one object;

wherein the non transitory computer readable media and one or more processors are further configured to determine the threat level associated with the cut-in operation of at least one object in accordance with the following equation:

$$P_{Threat}=\Sigma_i[T_i(\text{path,vel,accel,dist})*\{1+\Sigma_j K_{ij}(\text{turn signal,lat path,traffic,v2x info})\}],$$

in which:

"$T_i$" represents the initial threat value for the one other road user "i" corresponding to the at least one object based on the adjacency, and "$K_{ij}$" represents compounding threat factors "i" for the one other road user "i" based on the context.

2. The system of claim 1, wherein the non-transitory computer readable media and one or more processors are further configured to selectively activate at least one visual cue that includes a gap regulation cue based on the threat level associated with the cut-in operation of at least one object.

3. The system of claim 1, wherein the non-transitory computer readable media and one or more processors are further configured to selectively activate at least one visual cue that includes a motion coordination cue based on the threat level associated with the cut-in operation of at least one object.

4. The system of claim 1, wherein the non-transitory computer readable media and one or more processors are further configured to selectively activate at least one visual cue that includes a physical tether cue based on the threat level associated with the cut-in operation of at least one object.

5. The system of claim 1, wherein the non-transitory computer readable media and one or more processors are further configured to selectively activate at least one visual cue that includes a projection lighting cue based on the threat level associated with the cut-in operation of at least one object.

6. The system of claim 1, wherein the non-transitory computer readable media and one or more processors are further configured to selectively activate at least one visual cue that includes a vehicle lighting cue based on the threat level associated with the cut-in operation of at least one object.

7. The system of claim 1, wherein the non-transitory computer readable media and one or more processors are further configured to selectively activate at least one visual cue that includes a soft deployable object cue based on the threat level associated with the cut-in operation of at least one object.

8. The system of claim 1, wherein the non-transitory computer readable media and one or more processors are further configured to selectively activate at least one visual cue that includes a signage based on the threat level associated with the cut-in operation of at least one object.

9. The system of claim 1, wherein the non-transitory computer readable media and one or more processors are further configured to selectively activate at least one visual cue that includes a leader vehicle operation cue based on the threat level associated with the cut-in operation of at least one object.

10. The system of claim 1, wherein the non-transitory computer readable media and one or more processors are further configured to selectively activate at plurality of audio cues that include an active horn cue, and an audible chime cue based on the threat level associated with the cut-in operation of at least one object.

11. The system of claim 1, wherein the non-transitory computer readable media and one or more processors are further configured to:

obtain vehicle to infrastructure data as to the environment from infrastructure of the environment;

obtain vehicle to vehicle data as to the environment from the at least one object; and monitor the environment and determine the threat level associated with the cut-in operation of at least one object based also on the vehicle to infrastructure data and the vehicle to vehicle data in addition to the sensor data.

12. The system of claim 1, wherein the one or more vehicle control actions comprises automatically reducing a speed of the first vehicle, the second vehicle, or both, to allow the at least one object to pass both the first vehicle and the second vehicle in accordance with instructions provided by the one or more processors based on the threat level associated with the cut-in operation of at least one object.

13. The system of claim 1, wherein the non-transitory computer readable media and one or more processors are further configured to selectively communicate with the one or more other road users with both an audio cue and a visual cue to not move in between the first vehicle and the second vehicle based on the threat level associated with the cut-in operation of at least one object.

14. A method for a first vehicle of a transportation system, comprising:

coordinating, by a processor, a platooning operation between the first vehicle and a second vehicle;

obtaining, via a plurality of perception sensors including radar sensors, Lidar sensors, and ultrasonic sensors, sensor data as to objects and other road users in proximity to the first vehicle and the second vehicle;

monitoring, by the processor, an environment of the first vehicle and the second vehicle while platooning, based on the sensor data;

in response to the monitoring, determining, by the processor, a threat level associated with a cut-in operation of at least one object within the environment, based on a product of an initial threat value of the at least one object multiplied by a sum of multiple compounding threat factors for the at least one object added together, wherein:

the initial threat value of the at least one object is based on an adjacency of the at least one object and a context associated with the at least one object, wherein the adjacency corresponds to the initial threat value, and includes a path trajectory of the first vehicle, velocity of the at least one object, acceleration of the at least one object, and a relative distance or zone location of the at least one object;

the multiple compounding factors are determined based on a context associated with the at last one object, wherein the context corresponds to the corresponding threat factors, and includes each of the following: signal activation, lateral path distance to the first vehicle or the second vehicle, lateral path velocity in the direction of the first vehicle or the second vehicle, traffic congestion associated with the at least one object, and lane closure data; and the threat level associated with the cut-in operation of at least one object is further determined based on a heuristic method that evaluates the adjacency and the context in addition to a trained data driven convolutional neural network model that evaluates the adjacency and the context; and automatically provide one or more vehicle control actions of the first vehicle and the second vehicle, including coordinating movement of the first vehicle with the second vehicle, via the one or more processors, based on the threat level associated with the cut-in operation of at least one object; wherein the method further comprises:

determining, via the processor, the threat level in accordance with the following equation:

$$P_{Threat} = \Sigma_i [T_i(\text{path},\text{vel},\text{accel},\text{dist}) * \{1 + \Sigma_j K_{ij}(\text{turn signal},\text{lat path},\text{traffic},\text{v2x info})\}],$$

in which:

"$T_i$" represents the initial threat value for one other road user "i" corresponding to the at least one object based on the adjacency, and "$K_{ij}$" represents compounding threat factors "i" for the one other road user "i" based on the context.

15. The method of claim 14, further comprising providing, via the processor, a plurality of visual and audio cues that include each of the following: a gap regulation cue, a motion coordination cue, a physical tether cue, a projection lighting cue, a vehicle lighting cue, a deployable object cue, a signage cue, and a leader vehicle operation cue based on the threat level associated with the cut-in operation of at least one object.

16. The method of claim 14, further comprising: p1 obtaining vehicle to infrastructure data as to the environment from infrastructure of the environment;

obtaining vehicle to vehicle data as to the environment from the at least one object; and monitoring, via the processor, the environment and determine the threat level associated with the cut-in operation of at least one object based also on the vehicle to infrastructure data and the vehicle to vehicle data in addition to the sensor data.

17. The method of claim 14, wherein the one or more vehicle control actions comprises automatically reducing a speed of the first vehicle, the second vehicle, or both, to allow the at least one object to pass both the first vehicle and the second vehicle in accordance with instructions provided by the processor based on the threat level associated with the cut-in operation of at least one object.

18. The method of claim 14, further comprising:

selectively communicating, via the processor, with the one or more other road users with both an audio cue and a visual cue to not move in between the first vehicle and the second vehicle based on the threat level associated with the cut-in operation of at least one object.

* * * * *